United States Patent
Li et al.

(10) Patent No.: US 8,993,133 B1
(45) Date of Patent: Mar. 31, 2015

(54) INTERMEDIATE LAYER FOR PERPENDICULAR MAGNETIC RECORDING MEDIUM WITH HIGH PERMEABILITY GRAIN BOUNDARIES

(75) Inventors: Shaoping Li, San Ramon, CA (US); B. Ramamurthy Acharya, Fremont, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 12/977,533

(22) Filed: Dec. 23, 2010

(51) Int. Cl.
 *G11B 5/66* (2006.01)
 *G11B 5/706* (2006.01)

(52) U.S. Cl.
 CPC .................................. *G11B 5/70626* (2013.01)
 USPC .......................................... 428/829; 427/128

(58) Field of Classification Search
 None
 See application file for complete search history.

(56) References Cited

U.S. PATENT DOCUMENTS

| | | | |
|---|---|---|---|
| 5,034,286 A | 7/1991 | Nasu et al. | |
| 5,326,637 A | 7/1994 | Nasu et al. | |
| 5,392,290 A | 2/1995 | Brown et al. | |
| 5,820,963 A | 10/1998 | Lu et al. | |
| 5,840,394 A | 11/1998 | Ranjan et al. | |
| 6,406,600 B1 | 6/2002 | Takashima | |
| 6,410,133 B1 | 6/2002 | Kirino et al. | |
| 6,472,047 B1 | 10/2002 | Kirino et al. | |
| 6,495,252 B1 | 12/2002 | Richter et al. | |
| 6,534,206 B1 | 3/2003 | Kirino et al. | |
| 6,602,620 B1 * | 8/2003 | Kikitsu et al. | 428/842.2 |
| 6,730,421 B1 | 5/2004 | Kirino et al. | |
| 6,749,955 B2 | 6/2004 | Kirino et al. | |
| 6,797,137 B2 | 9/2004 | Sandlin et al. | |
| 6,811,890 B1 | 11/2004 | Zhou et al. | |
| 6,866,948 B2 | 3/2005 | Koda et al. | |
| 6,881,503 B2 | 4/2005 | Lu et al. | |
| 7,033,686 B2 | 4/2006 | Hirayama et al. | |
| 7,141,316 B2 | 11/2006 | Iwasaki et al. | |
| 7,226,674 B2 | 6/2007 | Koda et al. | |
| 7,229,588 B2 | 6/2007 | Sandlin et al. | |
| RE40,100 E | 2/2008 | Zhang | |
| 7,482,071 B2 | 1/2009 | Do et al. | |
| 8,394,243 B1 | 3/2013 | Jung et al. | |
| 8,488,276 B1 | 7/2013 | Jung et al. | |
| 2002/0110707 A1 | 8/2002 | Kirino et al. | |
| 2003/0054202 A1 | 3/2003 | Arisaka et al. | |
| 2003/0134154 A1 | 7/2003 | Kirino et al. | |

(Continued)

FOREIGN PATENT DOCUMENTS

JP 2005353256 A * 12/2005
WO WO 2009044794 A1 * 4/2009

OTHER PUBLICATIONS

Office Action in U.S. Appl. No. 12/242,210 issued Jun. 30, 2011.

(Continued)

*Primary Examiner* — Holly Rickman
*Assistant Examiner* — Lisa Chau

(57) ABSTRACT

A perpendicular magnetic recording (PMR) media including a non-magnetic or superparamagnetic grain isolation magnetic anisotropy layer (GIMAL) to provide a template for initially well-isolated small grain microstructure as well as improvement of $K_u$ in core grains of a magnetic recording layer. The GIMAL composition may be adjusted to have lattice parameters similar to a bottom magnetic recording layer and to provide a buffer for reducing interface strains caused by lattice mismatch between the bottom magnetic recording layer and an underlying layer.

27 Claims, 6 Drawing Sheets

(56) References Cited

U.S. PATENT DOCUMENTS

| | | | |
|---|---|---|---|
| 2004/0166376 A1 | 8/2004 | Kirino et al. | |
| 2004/0185308 A1 | 9/2004 | Koda et al. | |
| 2005/0100764 A1 | 5/2005 | Ranjan et al. | |
| 2005/0202286 A1 | 9/2005 | Chen et al. | |
| 2005/0214520 A1 | 9/2005 | Oikawa et al. | |
| 2005/0214588 A1 | 9/2005 | Iwasaki et al. | |
| 2005/0255336 A1* | 11/2005 | Mukai | 428/831 |
| 2006/0090998 A1 | 5/2006 | Honda et al. | |
| 2006/0199044 A1 | 9/2006 | Thangaraj et al. | |
| 2006/0204791 A1* | 9/2006 | Sakawaki et al. | 428/828.1 |
| 2006/0286414 A1 | 12/2006 | Racine et al. | |
| 2006/0289294 A1 | 12/2006 | Racine et al. | |
| 2007/0172706 A1 | 7/2007 | Chen | |
| 2007/0189916 A1 | 8/2007 | Zhang | |
| 2008/0206601 A1 | 8/2008 | Mukai | |
| 2009/0011281 A1* | 1/2009 | Oikawa et al. | 428/812 |
| 2009/0042062 A1* | 2/2009 | Girt et al. | 428/828.1 |
| 2009/0296278 A1* | 12/2009 | Inamura et al. | 360/135 |
| 2010/0140727 A1 | 6/2010 | Shimatsu et al. | |
| 2010/0247962 A1* | 9/2010 | Sasaki | 428/800 |

OTHER PUBLICATIONS

J. Ariake et al., "Co-Pt-TiO2 Composite Film for Perpendicular Magnetic Recording Medium", IEEE Transactions on Magnetics, vol. 41, No. 10, pp. 3142-3144, Oct. 2005.

H. S. Jung et al., "CoCrPtO-Based Granular Composite Perpendicular Recording Media", IEEE Transactions on Magnetics, vol. 43, No. 6, pp. 2088-2090, Jun. 2007.

S. H. Park et al., "Effect of MgO and Al2O3 on the Microstructure and Magnetic Properties of CoCrPt—oxide Perpendicular Recording Media", Journal of Applied Physics, vol. 97, No. 10, pp. 106-1-3, 2005.

H. S. Jung et al., "Effect of Oxygen Incorporation on Microstructure and Media Performance in CoCrPt—SiO2 Perpendicular Recording Media", IEEE Transactions on Magnetics, vol. 43, No. 2, pp. 615-620. Feb. 2007.

G. Choe et al., "Magnetic and Recording Characteristics of Reactively Sputtered CoPtCr—(Si—O, Ti—O, and Cr—O) Perpendicular Media", IEEE Transactions on Magnetics, vol. 42, No. 10, pp. 2327-2329, Oct. 2006.

Thomas P. Nolan et al. "Microstructure and Exchange Coupling of Segregated Oxide Perpendicular Recording Media", IEEE Transactions on Magnetics, vol. 43, No. 2, pp. 639-644, Feb. 2007.

H. S. Jung et al., "Origin of Incoherent Magnetic Switching Behavior in CoCrPt—SiO2 Perpendicular Magnetic Recording Media", Applied Physics Letters, vol. 91, No. 212502, pp. 1-3, 2007.

M. Zheng et al., "Role of Oxygen Incorporation in Co—Cr—Pt—Si—O Perpendicular Magnetic Recording Media", IEEE Transactions on Magnetics, vol. 40, No. 4, pp. 2498-2500, Jul. 2004.

S. N. Piramanayagam et al., "Advanced Perpendicular Recording Media Structure With a Magnetic Intermediate Layer", Applied Physics Letters, vol. 88, No. 092501, pp. 1-3, 2006.

Gary C. Rauch et al., "The Effect of Cluster Size on Media Noise in Co—Ni—P Thin Films", IEEE Transactions on Magnetics, vol. 28, No. 5, pp. 3105-3107, Sep. 1992.

Atsushi Hashimoto et al., "Improvement of Magnetic Properties of Granular Perpendicular Recording Media by Using a FCC Nonmagnetic Intermediate Layer With Stacking Faults", Applied Physics Letters, vol. 89, No. 262508, pp. 1-3, 2006.

Atsushi Hashimoto et al., "Pseudo-HCP Nonmagnetic Intermediate Layer for Granular Media with High Perpendicular Magnetic Anisotropy", Journal of Physics D: Applied Physics, vol. 41, No. 012002, pp. 1-4, 2008.

K. W. Wierman et al., "RuxCr1-x/Ta Underlayer for Co-alloy Perpendicular Magnetic Recording", Journal of Applied Physics, vol. 91, No. 10, pp. 8031-8033, May 2002.

Hua Yuan et al., "Ru+Oxide Interlayer for Perpendicular Magnetic Recording Media", Journal of Applied Physics, vol. 103, 07F513, pp. 1-3, 2008.

Unoh Kwon et al., "Ru/Ru—Oxide Interlayers for CoCrPtO Perpendicular Recording Media", IEEE Transactions on Magnetics, vol. 41, No. 10, pp. 3193-3195, Oct. 2005.

Arnett, et al."TMR and Squeeze at Gigabit Areal Densities", IEEE Transactions on Magnetics, V.28, No. 4, Jul. 1992, pp. 1984-1987.

H.S.Jung, et al. "Effect of Magnetic Softness in a Soft Layer on Media Properties of Hard/Soft Stacked Composite Perpendicular Media", Journal of Applied Physics 105, 07B740 (2009).

\* cited by examiner

INTERMEDIATE LAYER FOR PERPENDICULAR MAGNETIC RECORDING MEDIUM WITH HIGH PERMEABILITY GRAIN BOUNDARIES

TECHNICAL FIELD

This invention relates to the field of disk drives and more specifically, to perpendicular agnetic recording media with high permeability grain boundaries.

BACKGROUND

Magnetic recording media has begun to incorporate perpendicular magnetic recording (PMR) technology in an effort to increase areal density and has recently demonstrated densities of 612 Gbits/in$^2$. Generally, PMR media may be partitioned into three functional regions: a soft magnetic underlayer (SUL), a nonmagnetic intermediate layer (interlayer) and a magnetic recording layer (RL). Well-isolated smaller grains of higher magnetic anisotropy constant ($K_u$) for a bottom magnetic recording layer can reduce media noise to achieve these higher areal densities. Enhanced grain isolation in a bottom magnetic recording layer of a PMR media structure, for example, can provide a smaller magnetic cluster size and narrow the size distribution.

It has been determined experimentally that the interlayer thickness of recording media shows a strong correlation with receiver overwrite. Since 2000, constant efforts have been made by media companies and the magnetic recording community on reducing the interlayer thickness. Today the thickness of interlayers (e.g., containing Ru) can be reduced to around 10-15 nm from a previous level of around 30-40 nm. Nevertheless, experimental data also shows that a further reduction of Ru interlayer thickness may also have a negative impact on bit error rate (BER) performance due to the resultant c-axis dispersion in recording layers. Since 2005, numerous attempts have unsuccessfully been made to fabricate interlayers with either high permeability or ultra-thin Ru thickness.

The interlayer has several key functionalities, including introducing the magnetic layer's vertical crystal growth or textural growth so as to tightly control the sigma of the magnetic grains' c-axis distribution, thereby leading to a narrow switching field distribution. Additionally, the grain size and surface morphology of the interlayer directly dictates the grain size and the grain decoupling in the recording layer. Moreover, the interlayer thickness directly impacts the head/media separation. It is well known that Ru has the same crystal structure and very similar crystal lattice parameters as CoCrPtX alloy. The use of an Ru interlayer with sufficient thickness (e.g., >10 nm) may lead to a narrow c-axis distribution and a better controlling of its dome shape surface morphology.

In cases where the interlayer is very thin or the grain size is small, it may be impossible to obtain a very small c-axis dispersion of magnetic grains in the recording layer. Since 2005, there have been various attempts to make a multi-layer interlayer by adopting a laminated magnetic or non-magnetic interlayer structure (e.g., a CoCr(10 nm)/Ru(4.5 nm) and CoPt or CoIr(6 nm)/Ru(5 nm) stack), in order to reduce the effective thickness of the interlayer while achieving similar c-axis dispersion.

In view of the above, it is a challenging task to drastically reduce Ru thickness (or to replace Ru) without increasing the switching field distribution of the recording layer. More particularly, it is extremely difficult to maintain a narrow c-axis dispersion in a small grain size setting without employing a Ru interlayer having sufficient thickness.

BRIEF DESCRIPTION OF THE DRAWINGS

The present invention is illustrated by way of example, and not limitation, in the figures of the accompanying drawings in which.

DETAILED DESCRIPTION

Figure 1:
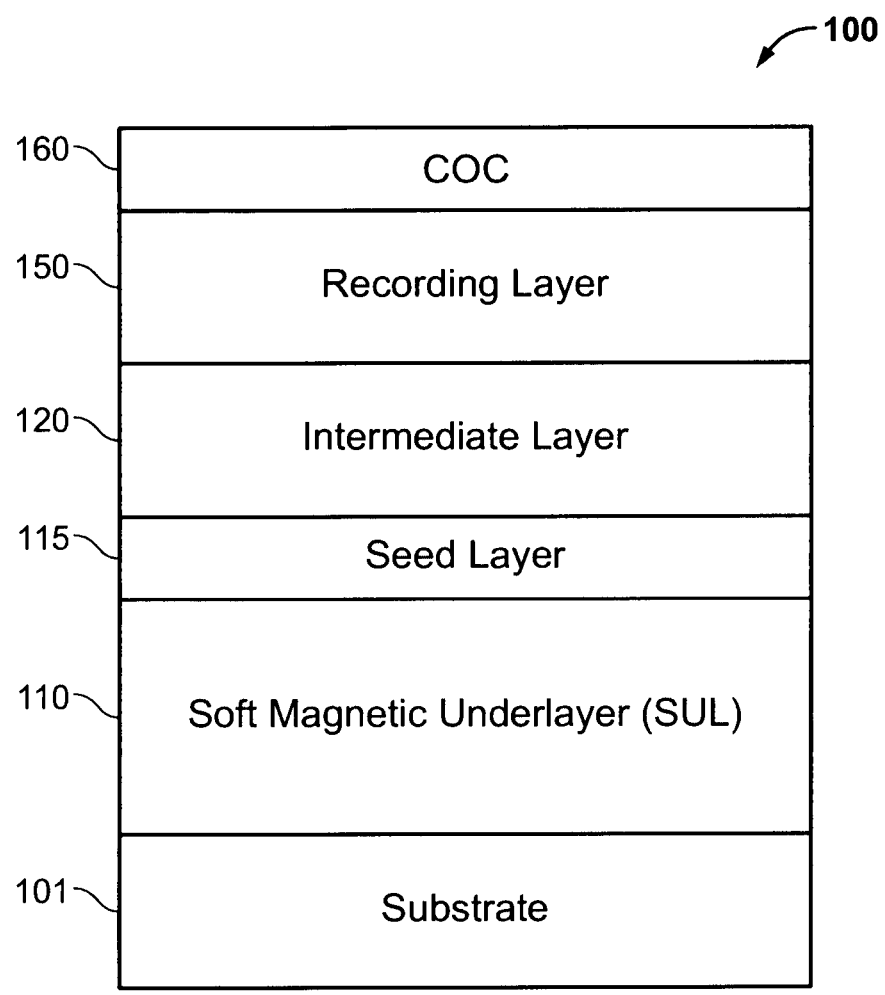
FIG. 1 is a cross-sectional view showing a perpendicular magnetic media structure having a granular intermediate layer design in accordance with an embodiment of the invention.

In the following description, numerous specific details are set forth such as examples of specific, components, processes, etc. to provide a thorough understanding of various embodiment of the present invention. It will be apparent, however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Some embodiments of the present invention are directed toward a perpendicular magnetic recording media having a soft magnetic underlayer (SUL), an intermediate layer (IL) disposed over the soft magnetic layer (wherein the IL includes a granular Ru structure separated by high permeability magnetic grain boundaries), and a magnetic recording layer (RL) disposed over the intermediate layer. The high permeability magnetic grain boundaries allow the IL to have a smaller effective magnetic thickness than that of a pure Ru IL having an equivalent thickness, while maintaining a limited c-axis dispersion provided by the physical thickness of the Ru grains. The intermediate layer may also be referred to herein as the "interlayer."

In some embodiments, the IL includes an effective magnetic thickness of between approximately 5 nm and 10 nm. In other embodiments, the IL includes an effective magnetic thickness of less than approximately 5 nm. Additionally, in some cases the IL includes an Ru grain size of between approximately 4 nm and 10 nm. In other cases, the IL includes an Ru grain size of between approximately 5 nm and 6 nm. The IL may comprise a grain boundary thickness of between approximately 1 nm and 1.5 nm. By way pf example, the grain boundaries may be formed by co-sputtering of targets or sputtering using a composite target. In certain embodiments, the SUL includes a thin layer of Ru embedded therein having a thickness between approximately 0.8 nm and 1.2 nm.

Further embodiments of the invention are directed toward a media drive, comprising a head having a magneto-resistive read element, and a perpendicular magnetic recording media operatively coupled to the head. The perpendicular magnetic recording media comprises an SUL, an IL disposed over the SUL, wherein the ILyer includes a granular Ru structure separated by high permeability magnetic grain boundaries, and a magnetic RL disposed over the IL.

Additional embodiments of the invention are directed toward a method comprising depositing an SUL over a substrate, depositing an IL over the SUL (the IL having a granular Ru structure separated by high permeability magnetic grain boundaries), and depositing a magnetic RL over the IL.

FIG. 1 is a cross-sectional view of a PMR media structure 100 including a non-magnetic intermediate layer (interlayer) 120 disposed between a soft magnetic underlayer SUL 110 and a magnetic recording layer (RL) 150, in accordance with an embodiment of the present invention. It will be appreciated by those of ordinary skill in the art that the layers discussed herein may be formed on both sides of substrate 101 to form a double-sided magnetic recording disk. However, only the layers on a single side of substrate 101 are shown for ease of illustration. Alternatively, a single sided perpendicular magnetic recording disk may be formed.

The embodiment of FIG. 1 features an interlayer 120 having a reduced effective magnetic thickness, while the Ru thickness is kept at a normal level in order to maintain the narrow c-axis dispersion in the media recording layer. As used herein, the term "effective magnetic thickness," $t_{eff}$, is the physical thickness of the interlayer with average volumetric magnetization $M_S$ (Int), normalized to the magnetization of the soft magnetic underlayer $M_S$ (SUL), such that $$t_{eff} = t\left(1 - \frac{M_S^{Int}}{M_S^{SUL}}\right).$$

The average volumetric magnetization of the interlayer 120 is the total magnetic moment of the interlayer stack structure, divided by its total volume.

The proposed approach for reducing the effective magnetic thickness of the interlayer 120 may enable an effective IL thickness as low as 2-3 nm. As set forth above, the IL 120 may comprise an effective magnetic thickness of between 5 nm and 10 nm. In other configurations, the IL 120 includes an effective magnetic thickness of less than 5 nm. It should be noted that the current industry standard for effective magnetic thickness is approximately 15-20 nm.

As depicted in FIG. 1, the PMR media structure 100 further includes substrate 101. Substrate 101 may comprise, for example, a glass, a metal, and/or a metal alloy material. In a particular embodiment, the substrate 101 is disk-shaped or annular. Glass substrates that may be used include, for example, a silica containing glass such as borosilicate glass and aluminosilicate glass. Metal and metal alloy substrates that may be used include, for example, aluminum (Al) and aluminum magnesium (AlMg) substrates, respectively. In an alternative embodiment, other substrate materials such as polymers and ceramics may be used. Substrate 101 may also be plated with a nickel phosphorous (NiP) layer (not shown). The substrate surface (or the plated NiP surface) may be polished and/or textured. Substrates and seed layers are known in the art and accordingly a more detailed discussion is not provided.

Disposed over the substrate 101 is an SUL 110. Generally, the SUL 110 may include any materials known in the art. In one exemplary embodiment, the SUL 110 includes a synthetic antiferromagnet (SAF) structure comprising two soft ferromagnetic layers (e.g., CoTaZr or CoFeTaZr, etc.) antiferromagnetically coupled with one another across a spacer layer (e.g., Ru, Re, Rh, Ir) disposed there between. A seed layer 115 is disposed over the SUL 110, and the interlayer 120 is disposed over the seed layer 115. Alternative embodiments do not feature the use of a seed layer between the SUL 110 and the interlayer 120.

As depicted in FIG. 1, the magnetic recording layer 150, including one or more layers, is disposed over the interlayer 120. The magnetic recording layer 150 may be any suitable thickness, with an exemplary thickness between 5 nm and 20 nm.

Completing the magnetic media structure depicted in FIG. 1, one or more layers may be formed on top of the magnetic recording layer 150. For example, an overcoat (OC) may be applied on top of the top magnetic recording layer to meet tribological requirements such as contact-start-stop (CSS) performance and corrosion protection. Predominant materials for the overcoat layer are carbon-based materials, such as hydrogenated or nitrogenated carbon to form a carbon over coat (COC) 160. A lubricant may be placed (e.g., by dip coating, spin coating, etc.) on top of the overcoat layer to further improve tribological performance. Exemplary lubricants include perfluoropolyether or phosphazene lubricant.

Figure 2:
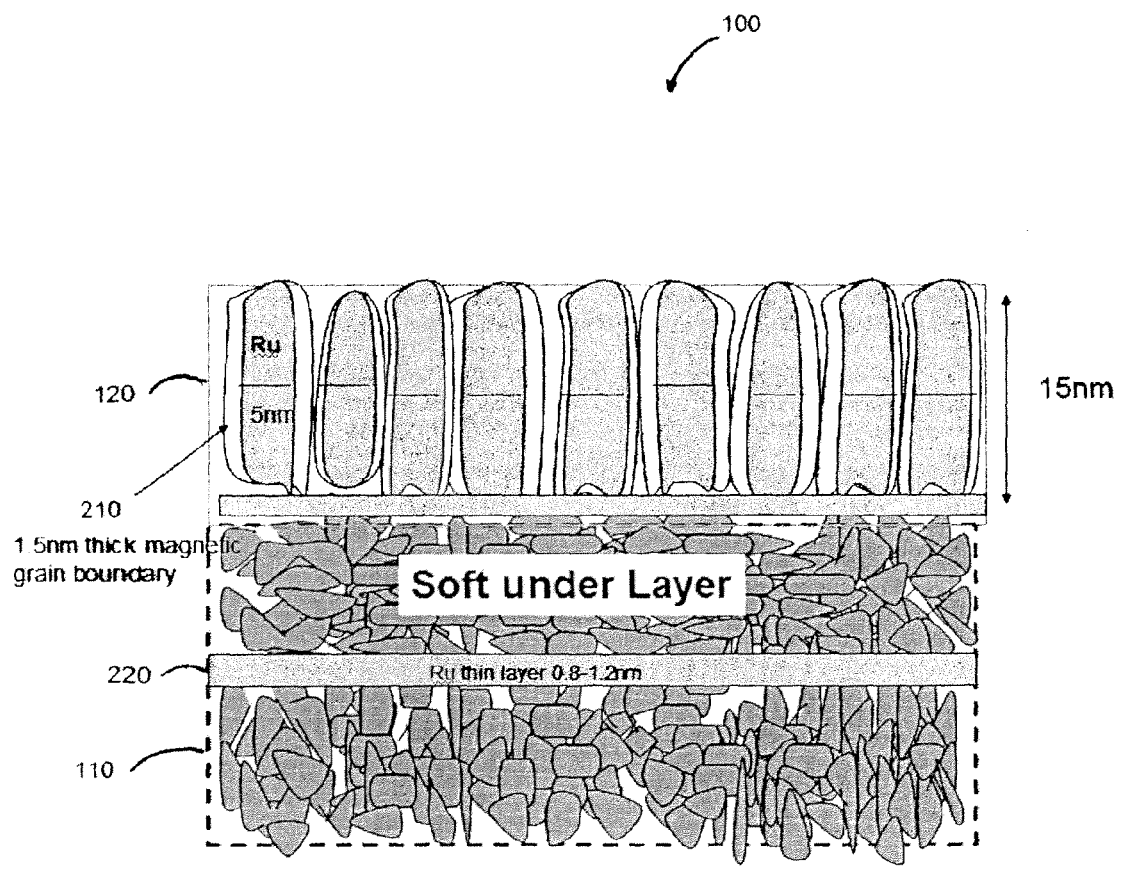
FIG. 2 is a cross-sectional illustration depicting the perpendicular magnetic media structure of FIG. 1.

FIG. 2 is a cross-sectional view of the interlayer 120 and SUL 110 of the PMR media structure 100 of FIG. 1. In particular, the Ru intermediate layer 120 includes magnetic grain boundaries 210 and has an ultra-thin effective magnetic thickness. The grain core consists of the hcp Ru and the grain boundaries are made from magnetic materials having high permeability. In some embodiments, the IL 120 includes an Ru grain size of between approximately 4 nm and 10 nm. In other embodiments, the IL 120 includes an Ru grain size of between approximately 5 nm and 6 nm. The grain boundary thickness may be between approximately 1 nm and 1.5 nm, while the Ru layer thickness may be about 15 nm. The grain boundaries may be formed by a co-sputtering process using CoPt, CoIr, CoCr, CoRu, CoO, NiO, Eu $Ru_2O_7$, or $Fe_2O_3$. In the illustrated embodiment, the SUL includes a thin layer of Ru embedded therein having a thickness between approximately 0.8 nm and 1.2 nm.

With further reference to FIG. 2, the composite intermediate layer 120 for PMR media may be formed using a co-sputtering process, wherein the grain boundaries 210 comprise magnetic materials with high permeability, thereby providing the non-resistance path for magnetic flux path for the writing process. The illustrated vertically laminated IL 120 with magnetic grain boundaries 210 can achieve ultra-thin effective magnetic thickness, ultra-small c-axis dispersion, and ultra-small grain size. By tailing both the grain size and the thickness of the grain boundaries 210, both very good c-axis dispersion and very small magnetic flux path for the writing process may be achieved.

Figure 3:
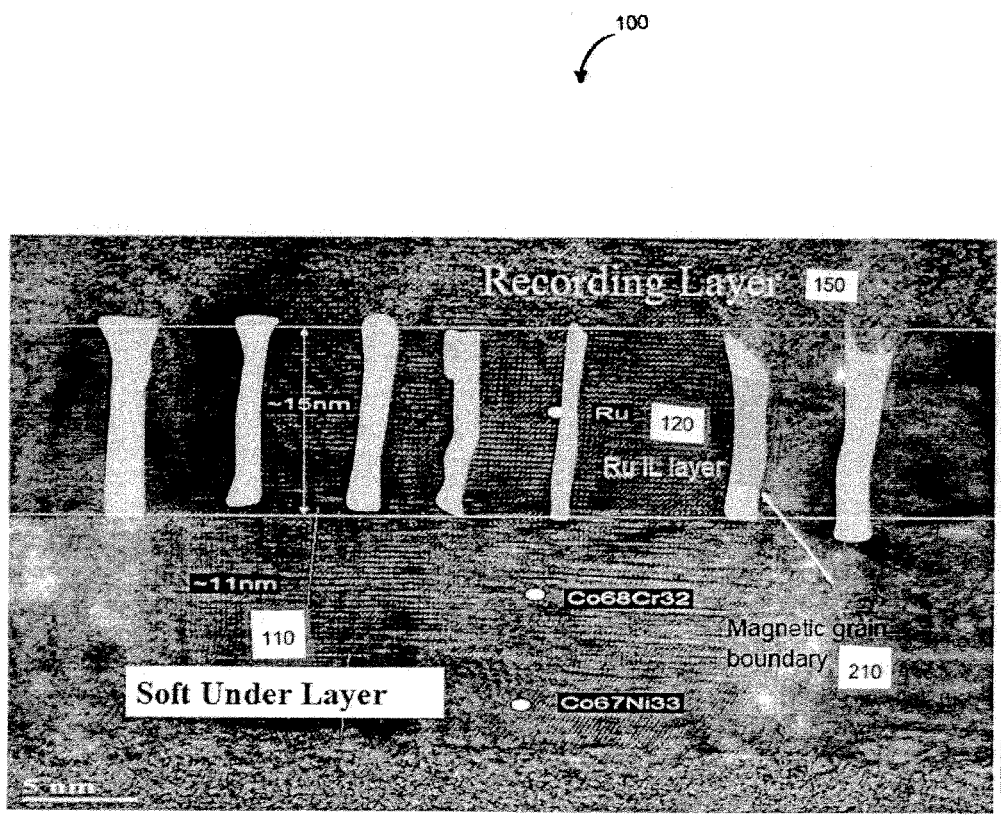
FIG. 3 is a cross-sectional high resolution view of the perpendicular magnetic media structures of FIG. 1.
Figure 4:
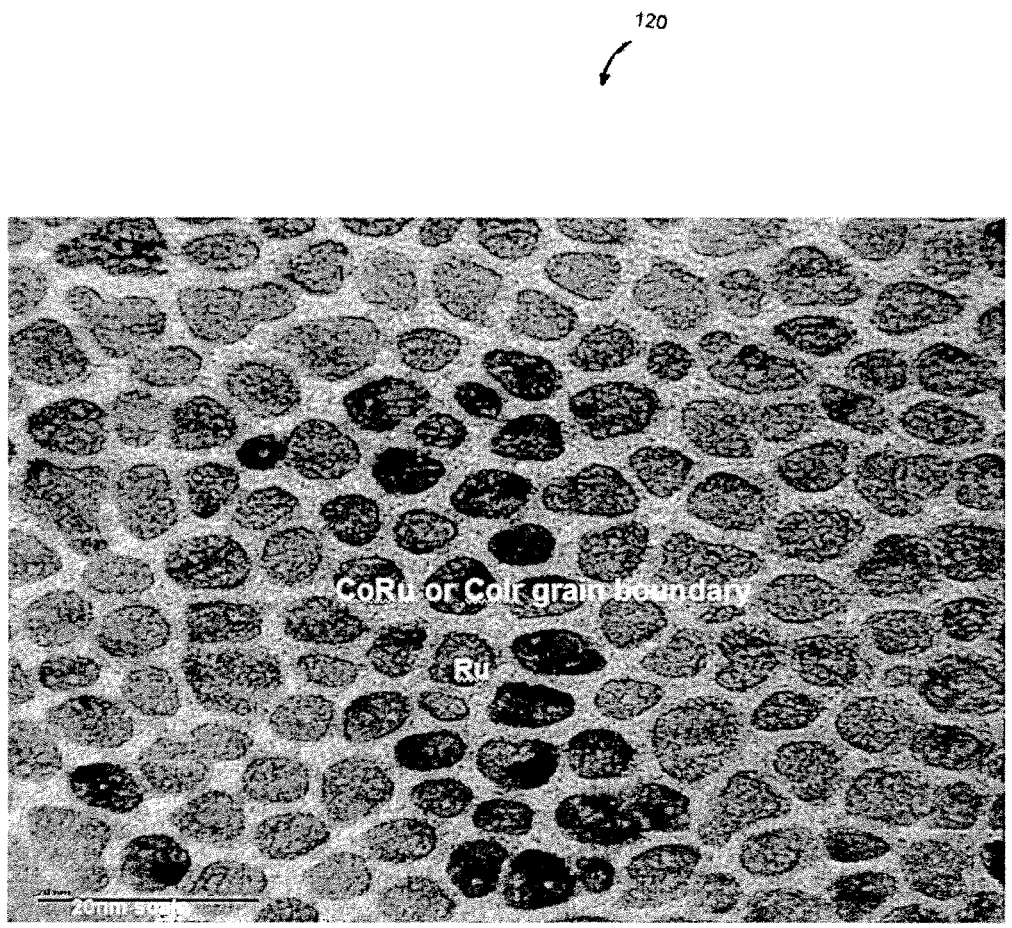
FIG. 4 is a planar view of the granular intermediate layer of the perpendicular magnetic media structure of FIG. 1.

FIG. 3 is a cross-sectional high resolution view of the perpendicular magnetic media structure 100 of FIG. 1, showing the recording layer 150 disposed on top of the composite Ru interlayer 120 disposed on top of the SUL 110. FIG. 4 is a planar view of the granular Ru intermediate layer 120 of the perpendicular magnetic media structure 100 of FIG. 1, wherein the Ru IL 120 includes high permeability grain boundaries 210 (e.g., CoRu or CoIr).

Figure 5:
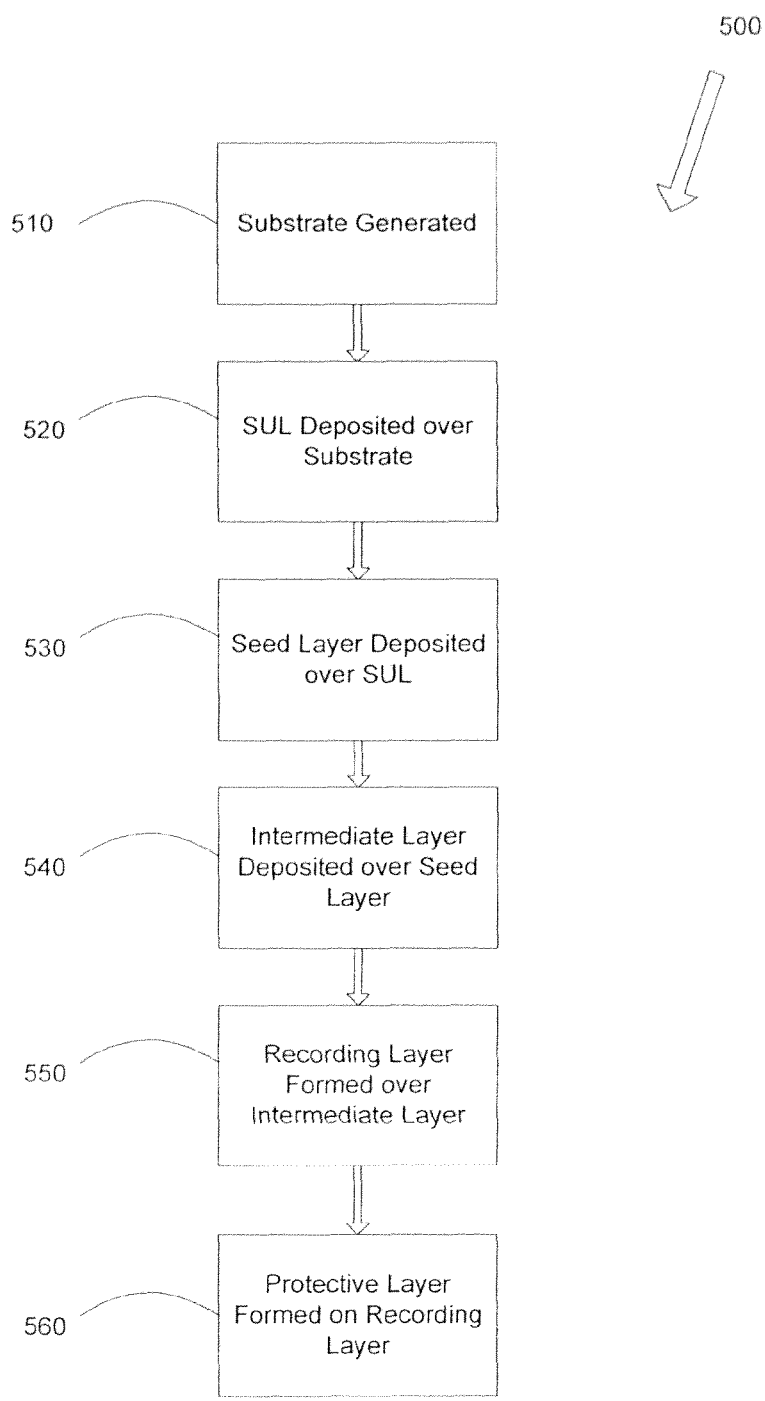
FIG. 5 illustrates a method of manufacturing a perpendicular magnetic media structure in accordance with an embodiment of the present invention.

FIG. 5 illustrates one embodiment of a method 500 of manufacturing perpendicular magnetic recording disk 100 having a media structure such as described herein. A substrate 101 is generated, or otherwise provided, at operation 510. The generation of a substrate for a magnetic recording disk is known in the art; accordingly a detailed discussion is not provided. In one embodiment, the substrate 101 may be plated (e.g., with NiP) and may also be polished and/or textured prior to subsequent deposition of layers.

In operation 520, the SUL 110 is deposited over substrate 101. Operation 530 comprises the deposition of the seed layer 115 on the SUL 110. In operation 540, the IL 120 is deposited over the seed layer 115. At operation 550, the magnetic recording layer 150 is deposited on the IL 120. In particular embodiments, deposition of the recording layer 150 may include depositing a bottom magnetic recording layer on the IL 120 and depositing one or more capping layers over the bottom magnetic recording layer. In an embodiment, the magnetic recording layer 150 is deposited with a reactive sputtering process where oxygen ($O_2$) is introduced into the sputtering chamber. The amount of $O_2$ provided during deposition may vary depending on the target alloy composition, thickness of the magnetic recording layer and deposition system configuration, etc In operation 550, the sputter target alloy composition may be any capable of achieving the compositions described elsewhere herein for the magnetic recording layer 150. Operation 560 completes the method 500 with a deposition of a protection layer, such as the COC 160.

The deposition of each of the SUL 110, seed layer 115, IL 120, recording layer 150 and the protection layer can be accomplished by a variety of methods well known in the art, for example, electroless plating, sputtering (e.g., static or in-line), chemical vapor deposition (CVD), ion-beam deposition (IBD), etc. Static sputter systems are available from manufacturers such as Intevac Inc. of Santa Clara, Calif. and Canon-Anelva Corp. of Japan. With in-line sputtering systems, disk substrates are loaded on a pallet that passes through a series of deposition chambers the deposit films successively on substrates. In-line sputtering systems are available from manufacturers such as Ulvac Corp. of Japan.

Figure 6:
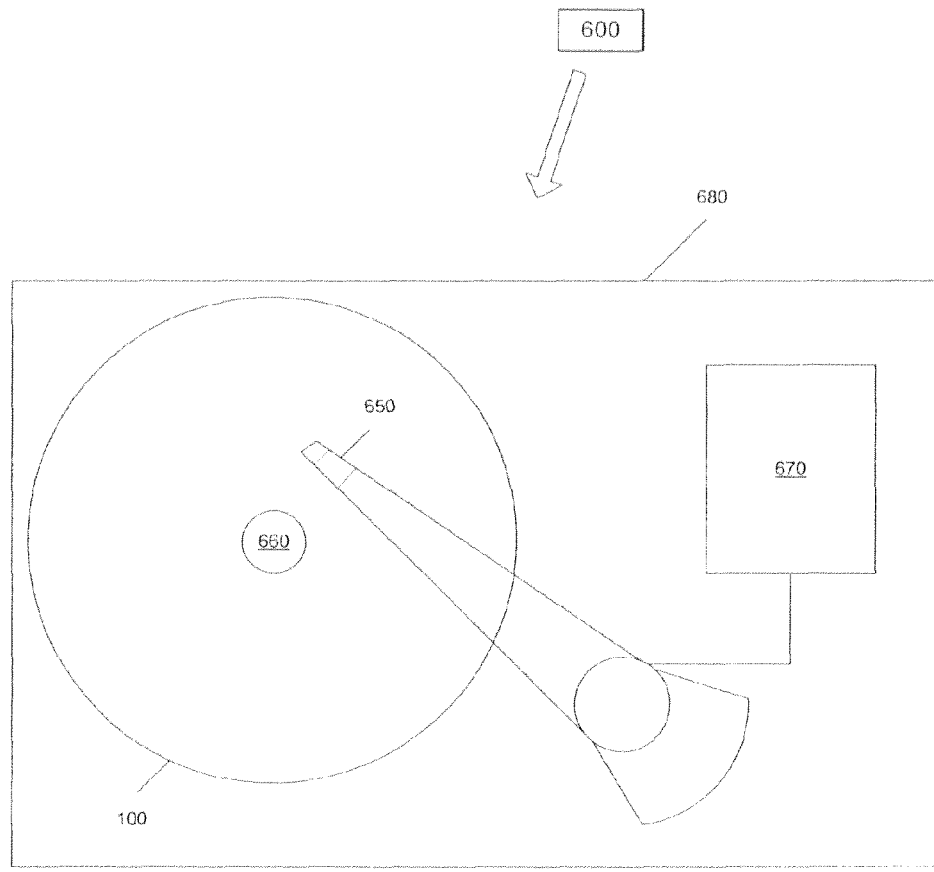
FIG. 6 illustrates a disk drive including a perpendicular magnetic recording disk in accordance with an embodiment of the present invention.

FIG. 6 illustrates a disk drive having disk 100. Disk drive 600 may include one or more disks 100 to store datum. Disk 100 resides on a spindle assembly 660 that is mounted to drive housing 680. Data may be stored along tracks in the magnetic recording layer of disk 100. The reading and writing of data is accomplished with head 650 that has both read and write elements. The write element is used to alter the properties of the perpendicular magnetic recording layer of disk 100. In one embodiment, head 650 may have a magneto-resistive (MR) and, in particular, a giant magneto-resistive (GMR) read element and an inductive write element. In an alternative embodiment, head 650 may be another type of head, for example, an inductive read/write head or a Hall effect head. A spindle motor (not shown) rotates spindle assembly 660 and, thereby, disk 100 to position head 650 at a particular location along a desired disk track. The position of head 650 relative to disk 100 may be controlled by position control circuitry 670. The use of disk 100 fabricated in the manners discussed above may improve the performance of the perpendicular magnetic recording layer of disk 100.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A perpendicular magnetic recording media, comprising:
    a soft magnetic underlayer;
    an intermediate layer disposed over the soft magnetic layer, wherein the intermediate layer includes a granular Ru structure separated by high permeability magnetic grain boundaries made from magnetic materials comprising CoIr, CoRu, NiO, $Eu_2Ru_2O_7$, or $Fe_2O_3$; and
    a magnetic recording layer disposed over the intermediate layer.

2. The perpendicular magnetic recording media of claim 1, wherein the magnetic grain boundaries allow the intermediate layer to have a smaller effective magnetic thickness than that of a pure Ru intermediate layer having an equivalent thickness, while maintaining a limited c-axis dispersion provided by the physical thickness of the Ru grains.

3. The perpendicular magnetic recording media of claim 2, wherein the intermediate layer includes an effective magnetic thickness of between approximately 5 nm and 10 nm.

4. The perpendicular magnetic recording media of claim 2, wherein the intermediate layer includes an effective magnetic thickness of less than 5 nm.

5. The perpendicular magnetic recording media of claim 1, wherein the intermediate layer includes an Ru grain size of between approximately 4 nm and 10 nm.

6. The perpendicular magnetic recording media of claim 1, wherein the intermediate layer includes an Ru grain size of between approximately 5 nm and 6 nm.

7. The perpendicular magnetic recording media of claim 6, wherein the intermediate layer includes a grain boundary thickness of between approximately 1 nm and 1.5 nm.

8. The perpendicular magnetic recording media of claim 1, wherein the soft magnetic underlayer includes a thin layer of Ru embedded therein.

9. The perpendicular magnetic recording media of claim 8, wherein the thin layer of Ru embedded in the soft magnetic underlayer has a thickness between approximately 0.8 nm and 1.2 nm.

10. A media drive, comprising:
    a head having a magneto-resistive read element; and
    a perpendicular magnetic recording media operatively coupled to the head;
    wherein the perpendicular magnetic recording media comprises:
        a soft magnetic underlayer;
        an intermediate layer disposed over the soft magnetic layer, wherein the intermediate layer includes a granular Ru structure separated by magnetic grain boundaries comprising CoIr, CoRu, NiO, $Eu_2Ru_2O_7$, or $Fe O_3$; and
        a magnetic recording layer disposed over the intermediate layer.

11. The media drive of claim 10, wherein the magnetic grain boundaries allow the intermediate layer to have a smaller effective magnetic thickness than that of a pure Ru intermediate layer having an equivalent thickness, while maintaining a limited c-axis dispersion provided by the physical thickness of the Ru grains.

12. The media drive of claim 11, wherein the intermediate layer includes an effective magnetic thickness of between approximately 5 nm and 10 nm.

13. The media drive of claim 11, wherein the intermediate layer includes an effective magnetic thickness of less than 5 nm.

14. The media drive of claim 10, wherein the intermediate layer includes an Ru grain size of between approximately 4 nm and 10 nm.

15. The media drive of claim 10, wherein the intermediate layer includes an Ru grain size of between approximately 5 nm and 6 nm.

16. The media drive of claim 10, wherein the intermediate layer includes a grain boundary thickness of between approximately 1 nm and 1.5 nm.

17. The media drive of claim 10, wherein the soft magnetic underlayer includes a thin layer of Ru embedded therein.

18. The media drive of claim 17, wherein the thin layer of Ru embedded in the soft magnetic underlayer has a thickness between approximately 0.8 nm and 1.2 nm.

19. A method, comprising:
depositing a soft magnetic underlayer over a substrate;
depositing an intermediate layer over the soft magnetic layer, the
intermediate layer having a granular Ru structure separated by magnetic grain boundaries comprising CoIr CoRu, NiO, $Eu_2Ru_2O_7$, or $Fe_2O_3$; and
depositing a magnetic recording layer over the intermediate layer.

20. The method of claim 19, wherein the magnetic grain boundaries allow the intermediate layer to have a smaller effective magnetic thickness than that of a pure Ru intermediate layer having an equivalent thickness, while maintaining a limited c-axis dispersion provided by the physical thickness of the Ru grains.

21. The method of claim 20, wherein the intermediate layer includes an effective magnetic thickness of between approximately 5 nm and 10 nm.

22. The method of claim 20, wherein the intermediate layer includes an effective magnetic thickness of less than 5 nm.

23. The method of claim 19, wherein the intermediate layer includes an Ru grain size of between approximately 4 nm and 10 nm.

24. The method of claim 19, wherein the intermediate layer includes an Ru grain size of between approximately 5 nm and 6 nm.

25. The method of claim 19, wherein the intermediate layer includes a grain boundary thickness of between approximately 1 nm and 1.5 nm.

26. The method of claim 19, wherein the soft magnetic underlayer includes a thin layer of Ru embedded therein.

27. The method of claim 26, wherein the thin layer of Ru embedded in the soft magnetic underlayer has a thickness between approximately 0.8 nm and 1.2 nm.

\* \* \* \* \*